US010669693B2

(12) United States Patent
Wei

(10) Patent No.: US 10,669,693 B2
(45) Date of Patent: Jun. 2, 2020

(54) SYSTEM AND METHOD FOR CONTROLLING A MACHINE THROUGH AN INTERRUPTED OPERATION

(71) Applicant: Caterpillar Inc., Deerfield, IL (US)

(72) Inventor: Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/044,832

(22) Filed: Jul. 25, 2018

(65) Prior Publication Data

US 2020/0032481 A1 Jan. 30, 2020

(51) Int. Cl.
| | |
|---|---|
| *E02F 9/20* | (2006.01) |
| *E02F 3/40* | (2006.01) |
| *E02F 3/43* | (2006.01) |
| *E02F 3/60* | (2006.01) |
| *G05D 1/00* | (2006.01) |
| *E02F 9/26* | (2006.01) |

(52) U.S. Cl.
CPC .............. *E02F 9/2029* (2013.01); *E02F 3/40* (2013.01); *E02F 3/43* (2013.01); *E02F 3/60* (2013.01); *E02F 9/265* (2013.01); *G05D 1/0033* (2013.01)

(58) Field of Classification Search
CPC ... E02F 9/2029; E02F 3/40; E02F 3/43; E02F 3/60

USPC ............................................................ 701/2
See application file for complete search history.

(56) References Cited

U.S. PATENT DOCUMENTS

| | | | |
|---|---|---|---|
| 5,941,921 A | 8/1999 | Dasys et al. | |
| 9,206,589 B2 * | 12/2015 | Price ...................... | G08C 17/02 |
| 9,481,977 B1 * | 11/2016 | Clar ........................ | E02F 3/841 |
| 9,670,649 B2 | 6/2017 | Bewley et al. | |
| 2004/0158355 A1 * | 8/2004 | Holmqvist ........... | G05D 1/0236 700/245 |
| 2009/0177337 A1 | 7/2009 | Yuet et al. | |
| 2016/0017573 A1 | 1/2016 | Colwell et al. | |
| 2016/0076228 A1 * | 3/2016 | Nau ........................ | E02F 9/261 701/50 |
| 2018/0176740 A1 * | 6/2018 | Goraya ................... | H04W 4/46 |

* cited by examiner

*Primary Examiner* — Yazan A Soofi
(74) *Attorney, Agent, or Firm* — Harrity & Harrity LLP

(57) ABSTRACT

A method of controlling a machine through an interrupted operation of the machine is provided. The method includes retrieving an existing load signal indicative of an existing external load on the machine by a controller prior to the interrupted operation. The method includes calculating an available load capacity for the machine defined as a difference between a maximum load capacity of the machine and the existing external load by the controller. Further, the method includes controlling the machine to execute a working operation by the controller corresponding to the available load capacity of the machine.

20 Claims, 5 Drawing Sheets

SYSTEM AND METHOD FOR CONTROLLING A MACHINE THROUGH AN INTERRUPTED OPERATION

TECHNICAL FIELD

The present disclosure relates to a system and a method for controlling a machine through an interrupted operation of the machine.

BACKGROUND

A machine, such as a dozer, is generally operated in a worksite in one of an autonomous mode, semi-autonomous mode and a manual mode. In the autonomous mode, the machine may be controlled from a central location located remotely from the worksite. Due to various factors, such as connectivity issues, operation of the machine may get interrupted. The machine may be in middle of a task, such as digging soil, when the operation of the machine gets interrupted.

When the machine resumes operation, the machine may start repeating the task again irrespective of the progress of the task before interruption in the operation of the machine. For example, after the dozer restarts, as per current algorithms, the dozer may start digging again corresponding to full digging load irrespective of an existing load on the dozer prior to the interruption. This may cause the dozer to get loaded beyond a maximum load capacity resulting in the dozer getting stuck. In another example, if the dozer is allowed to carry existing load to a dump location, at least some of the load capacity of the dozer may get wasted.

Therefore, there is a need for an improved system and method for controlling the machine through interrupted operation of the machine.

SUMMARY

In an aspect of the present disclosure, a method of controlling a machine through an interrupted operation of the machine is provided. The method further includes retrieving, by a controller, an existing load signal indicative of an existing external load on the machine prior to the interrupted operation. The method also includes calculating, by the controller, an available load capacity for the machine defined as a difference between a maximum load capacity of the machine and the existing external load. The method further includes controlling, by the controller, the machine to execute a working operation corresponding to the available load capacity of the machine.

In another aspect of the present disclosure, a control system for controlling a machine through an interrupted operation of the machine is provided. The control system includes a load sensor which generates an existing load signal. The existing load signal is indicative of an existing external load on the machine prior to the interrupted operation. The control system further includes a controller communicably coupled to the load sensor. The controller retrieves the existing load signal indicative of the existing external load on the machine prior to the interrupted operation. The controller further calculates an available load capacity for the machine defined as a difference between a maximum load capacity of the machine and the existing external load. The controller further controls the machine to execute a working operation corresponding to the available load capacity.

In yet another aspect of the present disclosure, a machine includes a power source, and a ground engaging member which propels the machine on a ground surface. The machine also includes an implement to execute a working operation. The machine further includes a load sensor which generates an existing load signal indicative of an existing external load on the implement prior to the interrupted operation. The machine further includes a controller communicably coupled to the load sensor. The controller retrieves the existing load signal indicative of the existing external load on the machine prior to the interrupted operation. The controller further calculates an available load capacity for the machine defined as a difference between a maximum load capacity of the machine and the existing external load. The controller further controls the machine to execute a working operation corresponding to the available load capacity.

Other features and aspects of this disclosure will be apparent from the following description and the accompanying drawings.

DETAILED DESCRIPTION

Figure 1:
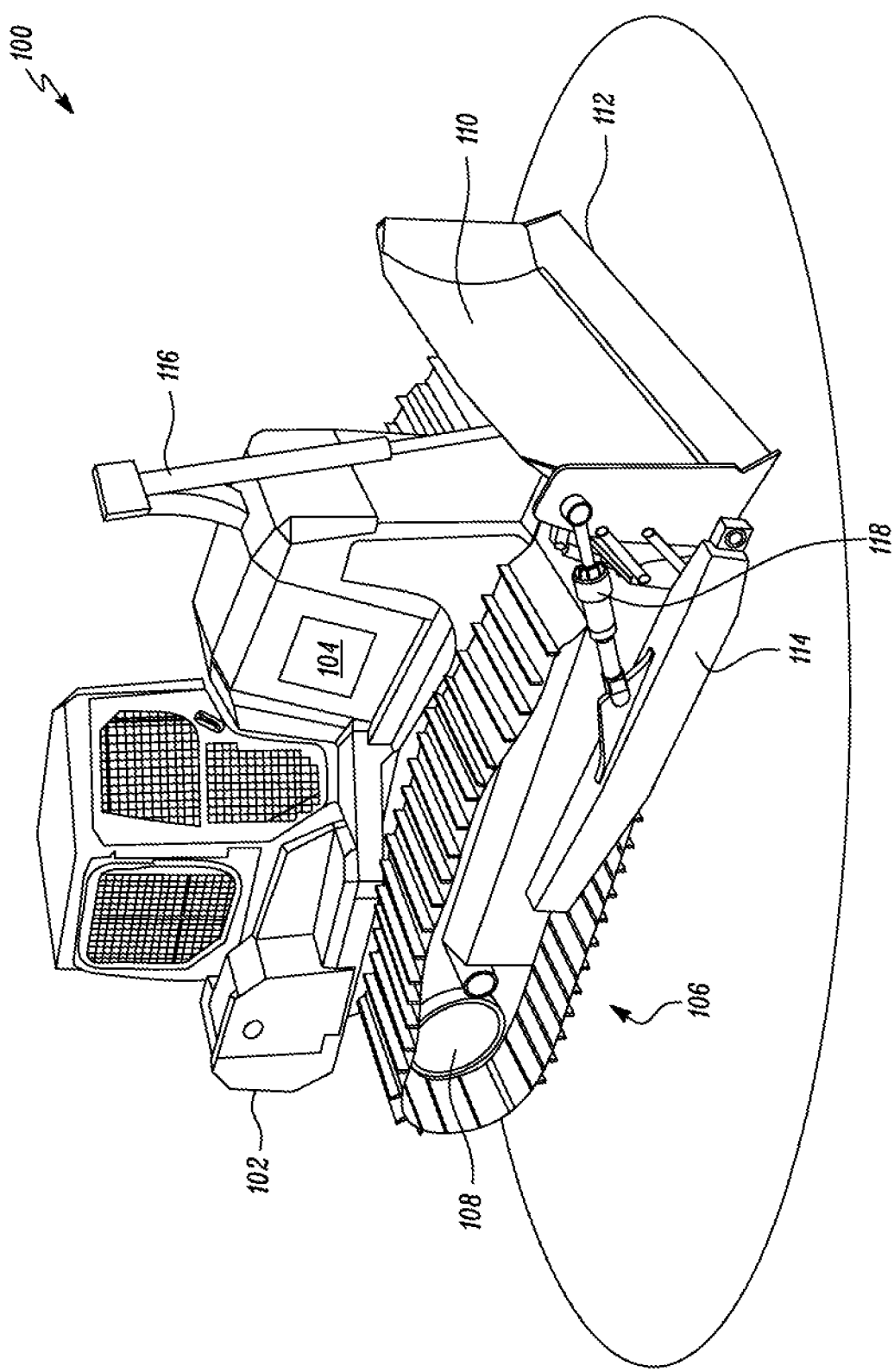
FIG. 1 shows an exemplary machine, according to an aspect of the present disclosure.

Wherever possible, the same reference numbers will be used throughout the drawings to refer to same or like parts. FIG. 1 shows an earthmoving machine 100. In the illustrated embodiment, the machine 100 is shown as a dozer. However, the machine 100 may be any earth moving machine that is configured to move materials on a worksite. Worksites on which the machine 100 may move materials may include, but are not limited to, a mining site, a landfill, a quarry, a construction site, or any other area in which movement of material is desired. The machine 100 may be employed at a worksite for a variety of earth moving operations, such as dozing, grading, leveling, bulk material removal, or any other type of operation that results in alteration of topography of the worksite.

The machine 100 includes a frame 102 and a prime mover, such as an engine 104. A track 106 is included as a ground-engaging drive mechanism. The track 106 is driven by a drive wheel 108 on each side of the machine 100 to propel the machine 100. While the machine 100 is shown as having the track 106 and is, generally, a "track-type" machine, other ground-engaging mechanisms may also be contemplated (e.g., tires in a wheeled configuration). For earthmoving, the machine 100 may employ an implement to push or otherwise move materials at the worksite. The implement is illustrated as a blade 110. However, it should be contemplated that various machines may include different types of implements such as a bucket, a scoop, etc.

During earth moving functions, the blade 110 may initially engage the worksite with a blade tip 112 of the blade 110. The blade 110 may be pivotally connected to the frame 102 by arms 114 on each side of the machine 100. One or more first hydraulic cylinders 116 may be coupled to the frame 102 to support the blade 110 in the vertical direction and allow the blade 110 to move up or down vertically. Additionally, one or more second hydraulic cylinders 118 may be included on each side of the machine 100 to allow the pitch angle of the blade tip 112 to change relative to a centerline (not shown) of the machine 100. The first and second hydraulic cylinders 116, 118 may be actuators that receive actuation instructions, to adjust, lift, lower, or otherwise move and/or position the blade 110.

The machine 100 may be operated in an autonomous mode, semi-autonomous mode or a manual mode as well. The present disclosure is not limited by mode of operation of the machine 100 in any manner. Operations of the machine 100 are controlled through a control system 200 schematically depicted in FIG. 2. The control system 200 includes a load sensor 202. The load sensor 202 is configured to generate an existing load signal 204. The existing load signal 204 is indicative of an existing external load on the machine 100. The existing external load refers to weight of soil, or any other material which is being hauled, pushed, lifted, or dragged by the blade 110 of the machine 100.

For example, the machine 100 may be used to lift soil from a first location on the worksite to a second location. In such a situation, weight of the soil being carried by the machine 100 may be referred to as the existing external load. In another example, the machine 100 may be used to dig a trench through the blade 110. In such a situation, weight of the material cut by the blade 110 and being moved may be referred to as the existing external load. Therefore, the existing external load may be defined as weight of the material added externally to the machine 100 during a working operation. The working operation may be defined as cutting, moving, digging, hauling, dragging, or adding material externally on the blade 110 of the machine 100 by any other such operation.

The load sensor 202 may be any type of a load sensor which may accurately determine existing external load being carried by the machine 100. In an embodiment, the load sensor 202 may be a pressure sensor which may sense pressure of hydraulic fluid in the first and second hydraulic actuators 116, 118 associated with the blade 110. In an embodiment, the load sensor 202 may be an engine power sensor which may sense amount of power being delivered by the engine 104 of the machine 100 and use the sensed data to estimate the existing external load on the machine 100. In another exemplary embodiment, the load sensor 202 may sense a geometrical profile of terrain over which the machine 100 is operating before and after a cutting, ripping, digging or any other such operation is executed, and then compare the two profiles to estimate the existing external load. The load sensor 202 may be any other type of sensor as well which may be suitably applied with various aspects of the present disclosure. The present disclosure is not limited by type of the load sensor 202 in any manner.

The control system 200 further includes a controller 206. The controller 206 is configured to control various operational aspects of the machine 100. The controller 206 may be any electronic controller or computing system including a processor which operates to perform operations, execute control algorithms, store data, retrieve data, gather data, and/or perform any other computing or controlling task. The controller 206 may be a single controller or may include more than one controller disposed to control various functions and/or features of the machine 100. The controller 206 includes an associated memory 208. The controller 206 may be otherwise connected to an external memory (not shown), such as a database or server. The associated memory 208 and/or external memory may include, but are not limited to including, one or more of read only memory (ROM), random access memory (RAM), a portable memory, and the like.

Figure 2:
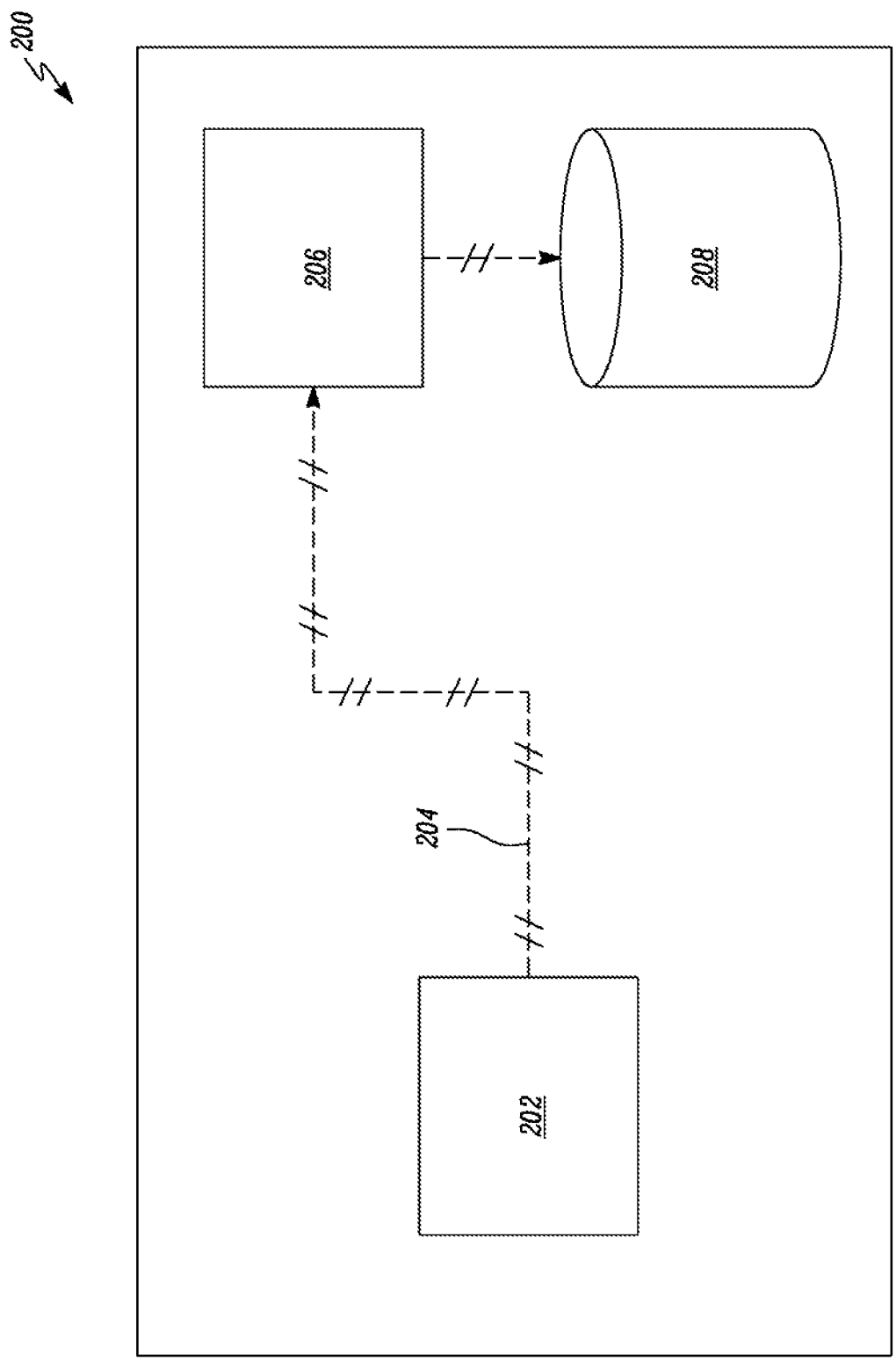
FIG. 2 schematically shows a control system for the machine, according to an aspect of the present disclosure.

FIG. 2 illustrates the controller 206 as an on-board controller of the machine 100. The controller 206 is communicably coupled to the load sensor 202. The controller 206 receives the existing load signal 204 generated by the load sensor 202 indicative of the existing external load. In an embodiment, the load sensor 202 may be configured to sense the profile of the terrain over which the machine 100 is operating. The controller 206 may receive a pre-cut terrain profile from the load sensor 202. The pre-cut terrain profile refers to a terrain profile before the machine 100 starts operating. The controller 206 may then receive a post-cut terrain profile from the load sensor 202. The post-cut terrain profile refers to a terrain profile after the machine 100 has performed an operation on the terrain. The controller 206 may compare the two profiles and estimate the existing external load of the machine 100. For example, the controller 206 may estimate volume difference between the pre-cut terrain profile and the post-cut terrain profile, and subsequently estimate the existing external load on the machine 100. The controller 206 may then store the existing external load on the machine 100 in the associated memory 208.

The controller 206 determines occurrence of an interruption in the operation of the machine 100. The interruption in operation may be due to various factors, such as lack of connectivity, mechanical failure, electronic anomaly, adverse environmental conditions, or any other such situation which may prompt the machine 100 to stop operations. The controller 206 may determine the occurrence of interruption through monitoring various operational parameters such as engine speed, power output, blade velocity, etc. After the determination of occurrence of the interruption, the controller 206 may initiate a re-starting procedure either by itself or through external intervention. External intervention may be through a worksite personnel, or an electronic device near the machine 100 or through any other suitable method or device.

After the machine 100 resumes operation, the controller 206 retrieves the existing load signal 204 from the memory 208. The existing load signal 204 is indicative of the existing external load on the machine 100 prior to the interruption in operation of the machine 100. The controller 206 calculates an available load capacity of the machine 100 based on the existing external load on the machine 100. The available load capacity is defined as a difference between a maximum load capacity of the machine 100 and the existing external load on the machine 100. The available load capacity is the additional external load which may be loaded on the machine 100 after the machine 100 is loaded with the existing external load.

After calculating the available load capacity, the controller 206 controls the machine 100 to execute a working operation corresponding to the available load capacity of the machine 100. The working operation may be defined as any suitable operation which may be performed by the machine 100 which may load the machine 100 by an external load. Examples of the working operation may vary as per the type of the machine 100. For example, in an embodiment when the machine 100 is a dozer, the working operation may be a cut and carry operation.

Figure 3:
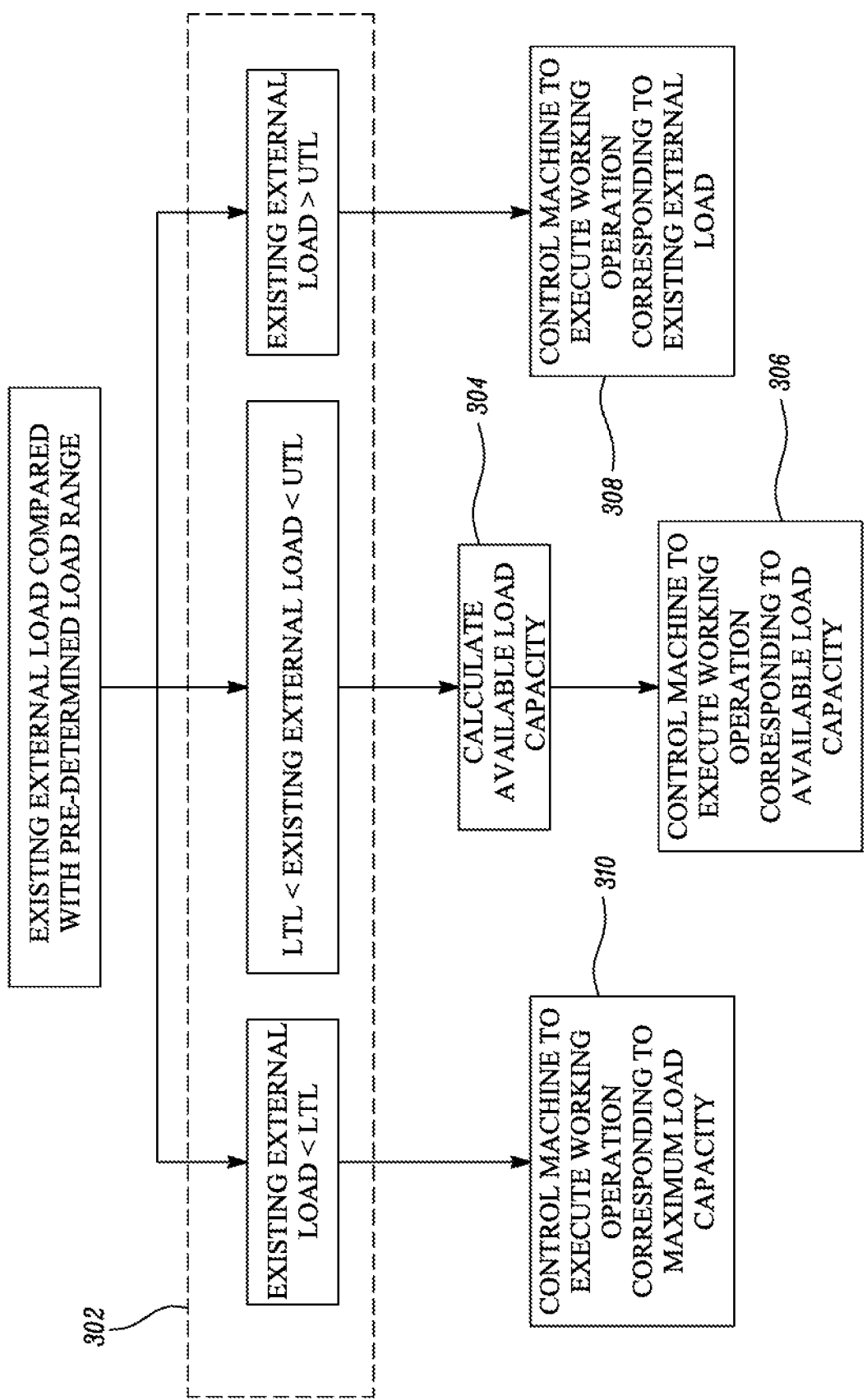
FIG. 3 schematically shows decision making steps based on existing external load of the machine, according to an aspect of the present disclosure.

FIG. 3 shows another aspect of the present disclosure illustrating decision making steps for controlling the machine 100. At block 302, the controller 206 determines whether the existing external load lies within a pre-determined load range based on the retrieved existing load signal 204. The pre-determined load range is defined between a lower threshold load (LTL) and an upper threshold load (UTL). If the existing external load lies within the pre-determined range between the lower threshold load and the upper threshold load, the controller 206 moves to block 304. At block 304, the controller 206 calculates the available load capacity. The controller 206 then moves to block 306. At block 306, the controller 206 controls the machine 100 to execute the working operation corresponding to the available load capacity.

If the existing external load is greater then the upper threshold load, the controller 206 moves to block 308. At block 308, the controller 206 controls the machine 100 to execute the working operation corresponding to the existing external load only. In such a case, the controller 206 does not load the machine 100 further. In an exemplary embodiment, when the machine 100 is a dozer, the controller 206 may control the machine 100 to carry the existing external load to a dump location. Further, if the existing external load is lesser than the lower threshold load, the controller 206 moves to block 310. At block 310, the controller 206 controls the machine 100 to execute the working operation corresponding to the maximum load capacity of the machine 100.

The pre-determined load range may be defined based on the various parameters such as type of the machine 100, terrain profile, material being carried by the machine 100 etc. The pre-determined load range also factors in cost of operation of the machine 100 in various scenarios. For example, when the existing external load is greater than the upper threshold load, the machine 100 executes the working operation corresponding to the existing external load and does not pick up any further load. This is because the cost savings incurred in carrying the extra load by the machine 100 may be less than the cost incurred on picking up the extra load. Thus, it is more cost effective to carry the existing external load on the machine 100 to the dump location. Similarly, when the existing external load is lesser than the lower threshold load, the existing external load is practically insignificant to carry out calculations of the available load capacity. Therefore, the pre-determined load range simplifies decision making steps in operation of the machine 100.

Figure 4:
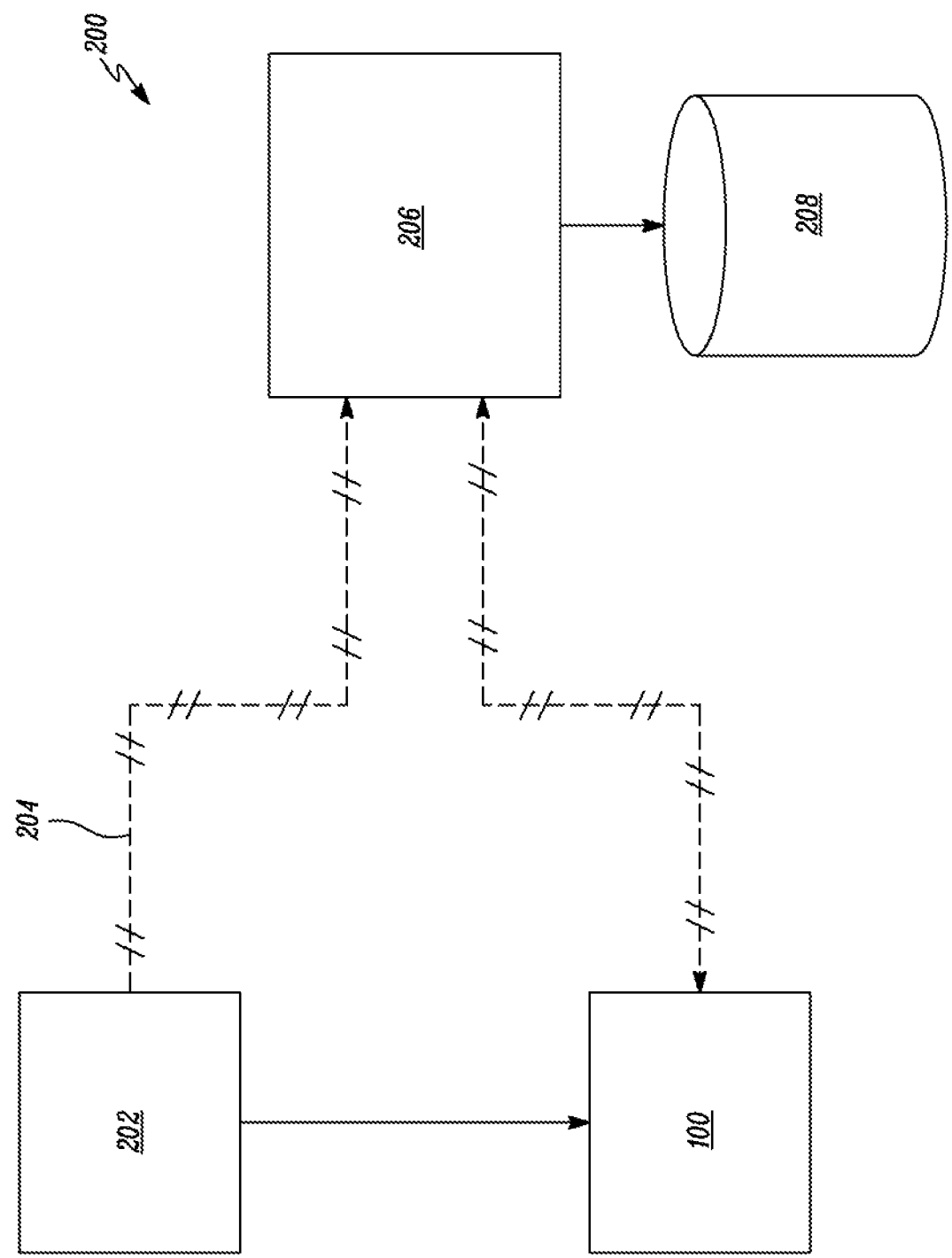
FIG. 4 schematically shows a control system for the machine, according to another aspect of the present disclosure.

FIG. 4 illustrates another embodiment of the control system 200. The controller 206 is illustrated as an off-board controller. The controller 206 may be located at an off-board location relative to the machine 100 such as an external server, a back-office, a remote location from the worksite etc. The controller 206 performs similar functions as the on-board controller. However, an off-board controller may provide better computing performance compared to the on-board controller on account of having better resources at the off-board location. In an embodiment, the controller 206 may communicate with an external server and the calculations may be performed at the external server, thus freeing up memory for carrying out other operational functions of the machine 100 more efficiently.

INDUSTRIAL APPLICABILITY

Figure 5:
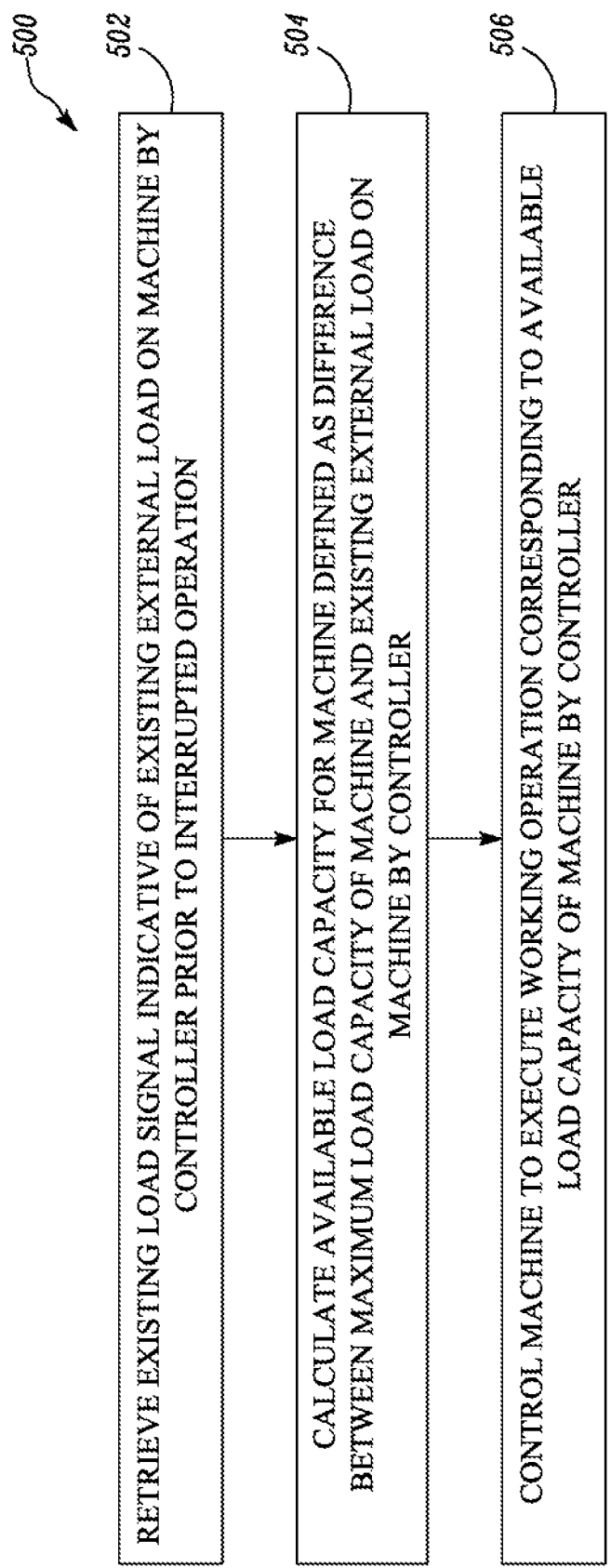
FIG. 5 shows a flow chart depicting a method of controlling the machine, according to an aspect of the present disclosure.

The present disclosure provides a method 500 to control the machine 100 through an interrupted operation of the machine 100. FIG. 5 illustrates the method 500 through a flowchart. At step 502, the controller 206 retrieves the existing load signal 204. The existing load signal 204 is indicative of the existing external load on the machine 100. The controller 206 retrieves the existing load signal 204 from the associated memory 208. The controller 206 may receive the existing load signal 204 from the load sensor 202 prior to the interruption in the operation of the machine 100. In an embodiment, the controller 206 receives the pre-cut terrain profile, and the post-cut terrain profile from the load sensor 202. The controller 206 may estimate the existing external load based on the difference between the pre-cut terrain profile and the post-cut terrain profile. The controller 206 may store the received existing load signal 204 in the associated memory 208. The controller 206 may further determine the occurrence of interruption of the operation of the machine 100 and retrieve the existing load signal 204 from the associated memory 208 after the machine 100 resumes operation.

At step 504, the controller 206 may calculate the available load capacity of the machine 100 based on the retrieved existing load signal 204. The available load capacity is calculated as the difference between the maximum load capacity of the machine 100 and the existing external load. The controller 206 may further determine whether the existing external load is within the pre-determined load range. The pre-determined load range is defined between the lower threshold load and the upper threshold load.

At step 506, the controller 206 controls the machine 100 to execute the working operation corresponding to the available load capacity of the machine 100. Further, if the existing external load is greater than the upper threshold load, the controller 206 may control the machine 100 to execute the working operation corresponding to the existing external load. In case the existing external load is lesser than the lower threshold load, the controller 206 may control the machine 100 to execute the working operation corresponding to the maximum load capacity of the machine 100.

The present disclosure provides an improved method 500 of controlling the machine 100 through the interrupted operation of the machine 100. After the machine 100 resumes operation, the controller 206 takes into account the existing external load on the machine 100, and accordingly decides further course of action. The controller 206 may calculate the available load capacity and perform the task so that original task gets completed without overloading the machine 100. Thus, the situations such as the machine 100 getting overloaded, or stuck are avoided altogether. Also, the controller 206 may take into account costs involved in resuming the ongoing operation by comparing the existing external load with the pre-determined load range, and then controls the machine 100 to perform a fresh cut or a take-over cut based on the existing external load. Thus, the controller 206 ensures optimal trade-off between loading the machine 100 further, or aborting the ongoing operation based on the existing external load on the machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of controlling a machine, the method comprising:
    retrieving, by a controller and after an occurrence of an interruption in operation of the machine, an existing load signal indicative of an existing external load on the machine prior to the occurrence of the interruption in operation of the machine;
    calculating, by the controller, an available load capacity of the machine based on a difference between a maximum load capacity of the machine and the existing external load; and
    controlling, by the controller, the machine to execute a working operation corresponding to the available load capacity of the machine.

2. The method of claim 1, further including:
    determining, by the controller and after the occurrence of the interruption in operation of the machine, that the existing external load is within a pre-determined load range,
        wherein calculating the available load capacity comprises:
            calculating, by the controller, the available load capacity of the machine based on determining that the existing external load is within the pre-determined load range.

3. The method of claim 2, wherein the pre-determined load range is defined between a lower threshold load and an upper threshold load.

4. The method of claim 1, further comprising:
    determining that a different existing external load is less than a lower threshold load; and
    controlling, by the controller, the machine to execute another working operation corresponding to the maximum load capacity of the machine based on determining that the different existing external load is less than the lower threshold load.

5. The method of claim 1, further comprising:
    determining that a different existing external load is greater than an upper threshold load; and
    controlling, by the controller, the machine to execute another working operation corresponding to the existing external load based on determining that the different existing external load is greater than the upper threshold load.

6. The method of claim 1, further comprising:
    identifying, by the controller, the existing load signal prior to the occurrence of the interruption in operation of the machine;
    storing, by the controller, the existing load signal in an associated memory of the controller; and
    determining, by the controller, the occurrence of the interruption in operation of the machine before retrieving the existing load signal.

7. The method of claim 1, further comprising:
    receiving, by the controller, a pre-cut terrain profile;
    receiving, by the controller, a post-cut terrain profile; and
    estimating, by the controller, the existing external load based on a difference between the pre-cut terrain profile and the post-cut terrain profile.

8. A control system for controlling a machine, the control system comprising:
    a load sensor configured to generate an existing load signal indicative of an existing external load on the machine prior to an occurrence of an interruption in operation of the machine; and
    a controller communicably coupled to the load sensor, the controller configured to:
        retrieve, after the occurrence of the interruption in operation of the machine, the existing load signal;
        calculate an available load capacity for the machine based on a difference between a maximum load capacity of the machine and the existing external load; and
        control the machine to execute a working operation corresponding to the available load capacity.

9. The control system of claim 8, wherein the controller is further configured to:
    determine that the existing external load is within a pre-determined load range,
        wherein the available load capacity for the machine is calculated further based on determining that the existing external load is within the pre-determined load range.

10. The control system of claim 9, wherein the pre-determined load range is defined between a lower threshold load and an upper threshold load.

11. The control system of claim 8, wherein the controller is further configured to:
    control the machine to execute another working operation that corresponds to the maximum load capacity of the machine when a different existing external load is lesser less than a lower threshold load.

12. The control system of claim 8, wherein the controller is further configured to:
    control the machine to execute another working operation that corresponds to the existing external load when a different existing external load is greater than an upper threshold load.

13. The control system of claim 8, wherein the controller is further configured to:
    identify the existing load signal;
    store the existing load signal in an associated memory of the controller; and
    determine the occurrence of the interruption in operation of the machine before retrieving the existing load signal.

14. The control system of claim 8, wherein the controller is further configured to:
    receive a pre-cut terrain profile;
    receive a post-cut terrain profile; and
    estimate the existing external load based on a difference between the pre-cut terrain profile and the post-cut terrain profile.

15. A machine comprising:
    a power source;
    a ground engaging member adapted to propel the machine on a ground surface;
    an implement adapted to execute a working operation;
    a load sensor configured to generate an existing load signal indicative of an existing external load on the machine prior to an occurrence of an interruption in operation of the machine; and
    a controller communicably coupled to the load sensor, the controller configured to:
        retrieve, after the occurrence of the interruption in operation of the machine, the existing load signal;
        calculate an available load capacity for the machine based on a difference between a maximum load capacity of the machine and the existing external load; and
        control the machine to execute a working operation corresponding to the available load capacity.

16. The machine of claim 15, wherein the controller is further configured to:
   determine that the existing external load is within a pre-determined load range,
      wherein the available load capacity for the machine is calculated further based on determining that the existing external load is within the pre-determined load range.

17. The machine of claim 16, wherein the pre-determined load range is defined between a lower threshold load and an upper threshold load.

18. The machine of claim 15, wherein the controller is further configured to:
   control the machine to execute another working operation that corresponds to the maximum load capacity of the machine when a different existing external load is less than a lower threshold load.

19. The machine of claim 15, wherein the controller is further configured to:
   control the machine to execute another working operation that corresponds to the existing external load when a different existing external load is greater than an upper threshold load.

20. The machine of claim 15, wherein the controller is further configured to:
   receive the existing load signal before the interruption in operation of the machine;
   store the received existing load signal in an associated memory of the controller; and
   determine the occurrence of the interruption in operation of the machine before retrieving the existing load signal.

* * * * *